(12) United States Patent
Hidaka et al.

(10) Patent No.: US 11,098,217 B2
(45) Date of Patent: Aug. 24, 2021

(54) COATING COMPOSITION, COATING FILM, AND LAMINATED BODY

(71) Applicant: DAIKIN INDUSTRIES, LTD., Osaka (JP)

(72) Inventors: Mai Hidaka, Osaka (JP); Hiromichi Momose, Osaka (JP); Tomohiro Shiromaru, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/548,957

(22) PCT Filed: Feb. 12, 2016

(86) PCT No.: PCT/JP2016/054083
§ 371 (c)(1),
(2) Date: Aug. 4, 2017

(87) PCT Pub. No.: WO2016/133010
PCT Pub. Date: Aug. 25, 2016

(65) Prior Publication Data
US 2018/0016461 A1  Jan. 18, 2018

(30) Foreign Application Priority Data
Feb. 16, 2015  (JP) .............................. JP2015-027996

(51) Int. Cl.
| C09D 127/18 | (2006.01) |
| A47J 36/02 | (2006.01) |
| B32B 27/30 | (2006.01) |
| B32B 27/20 | (2006.01) |
| C09D 127/12 | (2006.01) |
| C09D 7/40 | (2018.01) |
| C08K 3/22 | (2006.01) |
| C08K 3/34 | (2006.01) |
| C08K 7/18 | (2006.01) |

(52) U.S. Cl.
CPC .......... *C09D 127/18* (2013.01); *A47J 36/02* (2013.01); *B32B 27/20* (2013.01); *B32B 27/30* (2013.01); *C09D 7/40* (2018.01); *C09D 127/12* (2013.01); *C08K 3/22* (2013.01); *C08K 3/34* (2013.01); *C08K 7/18* (2013.01); *C08K 2003/2227* (2013.01); *C08L 2205/025* (2013.01)

(58) Field of Classification Search
None
See application file for complete search history.

(56) References Cited

U.S. PATENT DOCUMENTS

| 2007/0134488 A1* | 6/2007 | Hayakawa | A47J 36/02 428/323 |
| 2011/0293946 A1* | 12/2011 | Cao | A47J 36/02 428/422 |

FOREIGN PATENT DOCUMENTS

| EP | 1 016 466 A2 | 7/2000 |
| JP | 8-207500 A | 8/1996 |
| JP | 10-323283 A | 12/1998 |
| JP | 2001-218684 A | 8/2001 |
| JP | 2007-269878 A | 10/2007 |
| JP | 2009-519816 A | 5/2009 |
| JP | 2010-510158 A | 4/2010 |
| JP | 2011-116075 A | 6/2011 |
| JP | 2013-506739 A | 2/2013 |
| WO | 2007/070601 A2 | 6/2007 |
| WO | 2008/063560 A2 | 5/2008 |
| WO | 2011/041527 A1 | 4/2011 |

OTHER PUBLICATIONS

Tecdia, Singulating Hard Wafer Material: SiC, Tecdia Inc., retrieved Jan. 5, 2018, http://us.tecdia.com/casestudies/singulating-hard-wafer-material-sic/ (Year: 2018).*
International Preliminary Report on Patentability with translation of Written Opinion dated Aug. 22, 2017, issued by the International Searching Authority in application No. PCT/JP2016/054083.
International Search Report for PCT/JP2016/054083 dated May 17, 2016 [PCT/ISA/210].
Extended European Search Report dated Aug. 1, 2018 issued by the European Patent Office in counterpart application No. 16752396.8.

* cited by examiner

*Primary Examiner* — Cheng Yuan Huang
(74) *Attorney, Agent, or Firm* — Sughrue Mion, PLLC

(57) ABSTRACT

A coating composition that provides a coating film having better abrasion resistance. The composition includes: a fluororesin; and inorganic particles, the inorganic particles having a new Mohs hardness of 10 or higher and a substantially spherical shape. Also disclosed is a coating film produced from the coating composition and a laminate such as a cooking utensil including a substrate and the coating film.

4 Claims, No Drawings

COATING COMPOSITION, COATING FILM, AND LAMINATED BODY

CROSS REFERENCE TO RELATED APPLICATIONS

This application is a National Stage of International Application No. PCT/2016/054083, filed on Feb. 12, 2016, which claims priority from Japanese Patent Application No. 2015-027996, filed on Feb. 16, 2015, the contents of all of which are incorporated herein by reference in their entirety.

TECHNICAL FIELD

The present invention relates to a coating composition, a coating film, and a laminate. More specifically, the present invention relates to a coating composition and a coating film each containing a fluororesin and inorganic particles, and a laminate including the coating film.

BACKGROUND ART

Cooking utensils (e.g., frying pans, electric griddles, pots, and inner pots of rice cookers) are commonly provided with a coating layer of a fluororesin excellent in properties such as heat resistance, non-adhesiveness, and stain resistance, on a metal substrate of aluminum, stainless steel, or the like for the purpose of preventing scorching or sticking of cooking ingredients during cooking with heat.

In production of such cooking utensils having a coating layer of a fluororesin, various inorganic materials are often added, as filler, to materials for forming a coating layer with an aim of mainly improving the abrasion resistance.

For example, Patent Literature 1 discloses a heat cooker in which a single layer of a non-sticky coating formed of a spherical ceramic pigment, potassium hexatitanate whisker, and a fluororesin coating composition is formed on a cooking surface made of aluminum or an aluminum alloy.

Patent Literature 2 discloses that, for the purpose of further improving the hardness and abrasion resistance properties of a fluorinated coating, an anti-corrosive coating composition may contain hard filler particles of any of aluminum oxide, silicon carbide, zirconium oxide, and a scrap metal such as aluminum scrap, zinc scrap, and silver scrap.

CITATION LIST

Patent Literature

Patent Literature 1: JP H10-323283 A
Patent Literature 2: JP 2013-506739 T

SUMMARY OF INVENTION

Technical Problem

The present invention aims to provide a coating composition that gives a coating film with better abrasion resistance, and a coating film with better abrasion resistance.

Solution to Problem

The present inventors made an intensive study to find out that the use of particles having a new Mohs hardness of 10 or higher and having a substantially spherical shape as inorganic particles can surprisingly improve the abrasion resistance of coating films, thereby completing the present invention. Conventional coating compositions and coating films have contained inorganic particles prepared only by pulverizing. However, the inorganic particles prepared only by pulverizing cannot sufficiently improve the abrasion resistance of coating films.

Specifically the present invention relates to a coating composition including: a fluororesin; and inorganic particles, the inorganic particles having a new Mohs hardness of 10 or higher and having a substantially spherical shape.

In the coating composition, the inorganic particles viewed from an arbitrary angle preferably have an average circularity of 0.90 to 1.00.

In the coating composition, the inorganic particles are preferably at least one kind selected from the group consisting of alumina particles and silicon carbide particles.

In the coating composition, the fluororesin is preferably polytetrafluoroethylene.

In the coating composition, the fluororesin contained preferably includes polytetrafluoroethylene alone or, polytetrafluoroethylene and a fluororesin other than polytetrafluoroethylene, and the amount of the polytetrafluoroethylene is preferably 20% by mass or more relative to the total amount of the polytetrafluoroethylene and the fluororesin other than polytetrafluoroethylene.

In the coating composition, the amount of the inorganic particles is preferably 1 to 40% by mass relative to the amount of the fluororesin.

The present invention also relates to a coating film produced from the coating composition described above.

The present invention also relates to a coating film including: a fluororesin; and inorganic particles, the inorganic particles having a new Mohs hardness of 10 or higher and having a substantially spherical shape.

In the coating film, the inorganic particles viewed from an arbitrary angle preferably have an average circularity of 0.90 to 1.00.

In the coating film, the inorganic particles are preferably at least one kind selected from the group consisting of alumina particles and silicon carbide particles.

In the coating film, the fluororesin is preferably polytetrafluoroethylene.

In the coating film, the fluororesin contained preferably includes polytetrafluoroethylene alone or polytetrafluoroethylene and a fluororesin other than polytetrafluoroethylene, and the amount of the polytetrafluoroethylene is preferably 20% by mass or more relative to the total amount of the polytetrafluoroethylene and the fluororesin other than polytetrafluoroethylene.

In the coating film, the amount of the inorganic particles is preferably 1 to 40% by mass relative to the amount of the fluororesin.

The present invention also relates to a laminate including: a substrate; and a coating film produced from the coating composition described above or the coating film described above.

The laminate may be a cooking utensil.

Advantageous Effects of Invention

Having the above constitution, the coating composition of the present invention can provide a coating film with excellent abrasion resistance.

Having the above constitution, the coating film of the present invention has excellent abrasion resistance.

A coating film prepared from the coating composition of the present invention and the coating film of the present invention can be particularly suitably used as a top coat layer covering the surface of a cooking utensil.

The laminate and cooking utensil of the present invention each have excellent abrasion resistance.

DESCRIPTION OF EMBODIMENTS

The present invention is specifically described in the following.

The coating composition of the present invention contains a fluororesin and inorganic particles.

The fluororesin is preferably at least one selected from the group consisting of polytetrafluoroethylene (PTFE), tetrafluoroethylene (TFE)/perfluoro(alkyl vinyl ether) (PAVE) copolymers (PFA), TFE/hexafluoropropylene (HFP) copolymers (FEP), ethylene (Et)/TFE copolymers (ETFE), Et/TFE/HFP copolymers, polychlorotrifluoroethylene (PCTFE), chlorotrifluoroethylene (CTFE)/TFE copolymers, Et/CTFE copolymers, and polyvinylidene fluoride (PVDF), more preferably at least one selected from the group consisting of PTFE, PFA, and FEP.

In particular, the fluororesin is preferably PTFE because the formed coating film has particularly excellent abrasion resistance.

The PTFE preferably has fibrillation properties. In the case where the PTFE has fibrillation properties, the inorganic particles are not likely to fall off the coating film, leading to further better abrasion resistance of the coating film.

The presence of the fibrillation properties can be confirmed by "paste extrusion", a typical method of molding "high-molecular-weight PTFE powder" that is a powder prepared from a polymer of TEE, because the fibrillation properties of the high-molecular-weight PTFE enables paste extrusion thereof. In the case where an unfired molded product obtained by the paste extrusion has substantially no strength or elongation, for example, in the case where the molded product has an elongation of 0% and is broken when pulled, the molded product is considered to have no fibrillation properties.

The PTFE preferably has non-melt-fabricability. The non-melt-fabricability refers to a property that the melt flow rate cannot be measured in conformity with ASTM D-1238 and D-2116 at a temperature higher than the crystallization melting point.

For further better abrasion resistance, the PTFE has a standard specific gravity (SSG) of preferably 2.13 to 2.23, more preferably 2.13 to 2.19. The SSG is the SSG determined in ASTM 04895-89 as the index of the molecular weight of polytetrafluoroethylene having no melt-molding fabricability.

The PTFE preferably has a melting point of 325° C. to 347° C. The melting point is a value measured by differential scanning calorimetry (DSC) at a rate of temperature rise of 10° C./min.

The PTFE may be either a TFE homopolymer consisting of tetrafluoroethylene (TFE) alone or modified PTFE including TFE and a modifying monomer. The modifying monomer is not particularly limited as long as it is copolymerizable with TFE. Examples thereof include: perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); perfluorovinyl ethers; perfluoroalkyl ethylenes; and ethylene. A single modifying monomer or multiple modifying monomers may be used.

The perfluorovinyl ethers are not particularly limited, and examples thereof include an unsaturated perfluoro compound represented by the formula (1):

$$CF_2=CF-ORf \qquad (1),$$

where Rf represents a perfluoro organic group. The "perfluoro organic group" as used herein refers to an organic group in which all the hydrogen atoms bonded to carbon atoms are substituted with fluorine atoms. The perfluoro organic group may have ether oxygen.

Examples of the perfluorovinyl ethers include perfluoro (alkyl vinyl ether) (PAVE) which is a compound represented by the formula (1) where Rf is a C1-C10 perfluoroalkyl group. The carbon number of the perfluoroalkyl group is preferably 1 to 5.

Examples of the perfluoroalkyl group in the PAVE include a perfluoromethyl group, a perfluoroethyl group, a perfluoropropyl group, a perfluorobutyl group, a perfluoropentyl group, and a perfluorohexyl group. Preferred is a perfluoro (propyl vinyl ether) (PPVE) in which the perfluoroalkyl group is a perfluoropropyl group.

Examples of the perfluorovinyl ethers further include a compound represented by the formula (I) where Rf is a C4-C9 perfluoro(alkoxyalkyl) group, a compound represented by the formula (1) where Rf is a group represented by the following formula:

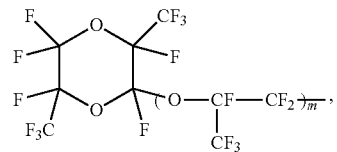

where m is an integer of 0 or 1 to 4, and a compound represented by the formula (1) where Rf is a group represented by the following formula:

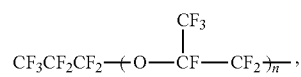

where n is an integer of 1 to 4.

The perfluoroalkyl ethylenes are not particularly limited, and examples thereof include (perfluorobutyl)ethylene (PFBE) and (perfluorohexyl)ethylene.

The modifying monomer of the modified PTFE is preferably at least one selected from the group consisting of HFP, CTFE, VDF, PPVE, PFBE, and ethylene. The modifying monomer is more preferably at least one selected from the group consisting of HFP and CTFE.

In the modified PTFE, the amount of the modifying monomer unit is preferably 1% by mass or less, more preferably 0.001 to 1% by mass, based on the total amount of all monomer units. The modifying monomer unit as used herein means a part derived from a modifying monomer in the molecular structure of the modified PTFE. The term "all monomer units" means all parts derived from monomers in the molecular structure of the modified PTFE.

From the standpoint of non-adhesiveness, the coating composition preferably contains the fluororesin in an amount of 30.0 to 99.0% by mass. The amount of the fluororesin is more preferably 40.0% by mass or more and 97.0% by mass or less.

The coating composition may contain the PTFE and a fluororesin other than the PTFE. Examples of the fluororesin other than the PTFE include TFE/PAVE copolymers (PFA), TFE/HFP copolymers (FEP), ethylene (Et)/TFE copolymers (ETFE), Et/TFE/HFP copolymers, polychlorotrifluoroethylene (PCTFE), CTFE/TFE copolymers, Et/CTFE copolymers, and polyvinylidene fluoride (PVDF).

The fluororesin other than the PTFE is preferably melt-fabricable. The term "melt-fabricable" means that the polymer can be molten and fabricated using a conventional fabrication device such as an extruder or an injection molding apparatus. The fluororesin therefore commonly has a melt flow rate (MFR) of 0.01 to 100 g/10 min.

The MFR is a value obtained as the mass (g/10 min) of the polymer flown from a nozzle (inner diameter: 2 mm, length: 8 mm) per 10 minutes measured in conformity with ASTM D1238 using a melt indexer (Yasuda Seiki Seisakusho Ltd.) at a measuring temperature (e.g., 372° C. for PFA and FEP, 297° C. for ETFE) and a load (e.g., 5 kg for PFA, FEP, and ETFE) each determined in accordance with the kind of the fluororesin.

The fluororesin other than the PTFE has a melting point of preferably 150° C. or higher and lower than 322° C., more preferably 200° C. to 320° C., still more preferably 240° C. to 320° C. The melting point is a temperature corresponding to the maximum value of a heat-of-fusion curve obtained by increasing the temperature using a differential scanning calorimeter (DSC) at a rate of 10° C./rain.

The coating composition preferably contains, as the fluororesin, the FIFE alone or the PTFE and a fluororesin other than the PTFE.

In the coating composition, the amount of the PTFE is preferably 1% by mass or more, more preferably 20% by mass or more, still more preferably 10% by mass or more, particularly preferably 70% or more, relative to the total amount of the PTFE and the fluororesin other than the PTFE. The upper limit of the amount may be 100% by mass.

In the case where the coating composition contains the PTFE and a fluororesin other than the PTFE, the mass ratio between the PTFE and the fluororesin other than the PTFE is preferably 1/99 to 99/1, more preferably 10/90 to 99/1, still more preferably 20/80 to 99/1. If the amount of the PTFE is too small, the abrasion resistance of the coating film may be insufficient.

The mass of the FIFE contained in the coating composition can be calculated by a known analysis method such as infrared spectroscopy or thermogravimetry-differential thermal analysis (TG-DTA).

The coating composition may contain a heat-resistant resin. The heat-resistant resin generally has only to be a resin that is recognized to have heat resistance, and is preferably a resin having a continuous service temperature of 150° C. or higher. It should be noted that the heat-resistant resin does not include the above fluororesin.

The heat-resistant resin is not particularly limited, and is preferably at least one resin selected from the group consisting of polyamide imide resins, polyimide resins, polyether sulfone resins, polyetherimide resins, polyether ether ketone resins, aromatic polyester resins, and polyarylene sulfide resins.

The polyamide imide resins (PAI) are resins each formed of a polymer having an amide bond and an imide bond in the molecular structure. The PAI is not particularly limited, and examples thereof include resins formed of any high molecular weight polymer obtained by any of the following reactions: a reaction between an aromatic diamine having an amide bond in the molecule and an aromatic tetravalent carboxylic acid (e.g., pyromellitic acid); a reaction between an aromatic trivalent carboxylic acid (e.g., trimellitic anhydride) and a diamine (e.g., 4,4-diaminophenyl ether) or a diisocyanate (e.g., diphenylmethane diisocyanate); and a reaction between a dibasic acid having an aromatic imide ring in the molecule and a diamine. For excellent heat resistance, the PAI is preferably a resin formed of a polymer having an aromatic ring in the main chain.

The polyimide resins (PI) are resins each formed of a polymer having an imide bond in the molecular structure. The PI is not particularly limited, and examples thereof include resins formed of any high molecular weight polymer obtained by a reaction of an aromatic tetravalent carboxylic anhydride such as pyromellitic anhydride. For excellent heat resistance, the PT is preferably a resin formed of a polymer having an aromatic ring in the main chain.

The polyether sulfone resins (PES) are resins each formed of a polymer having a repeating unit represented by the following formula.

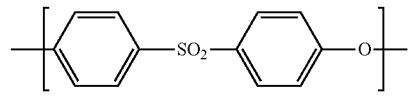

The PES is not particularly limited, and examples thereof include resins formed of any polymer obtained by polycondensation of dichlorodiphenyl sulfoneand bisphenol.

In order to achieve excellent adhesion to the substrate, to achieve sufficient heat resistance even, at temperature for sintering performed in forming cooking utensils, and to achieve excellent corrosion resistance of the resulting cooking utensils, the heat-resistant resin is preferably at least one resin selected from the group consisting of PIAs, PIs, and PESs. PAIs, PIs, and PESs may be used alone or may be used in combination of two or more in each group.

For excellent adhesion to the substrate and heat resistance, the heat-resistant resin is more preferably at least one resin selected from the group consisting of PAIs and PIs.

For excellent corrosion resistance, the heat-resistant resin is preferably a mixture of a PES and at least one selected from the group consisting of PAIs and PIs. In other words, the heat-resistant resin may be a mixture of a PES and a PAI, a mixture of a PES and a PI, or a mixture of a PES, a PAI, and a PI. The heat-resistant resin is particularly preferably a mixture of a PES and a PAI.

The coating composition contains inorganic particles having a substantially spherical shape. Containing inorganic particles having a substantially spherical shape, the coating composition can give a coating film with excellent abrasion resistance. The inorganic particles do not contain inorganic particles prepared only by pulverizing but contain inorganic particles prepared by pulverizing and subsequent spheroidization.

From the standpoint of abrasion resistance, the inorganic particles are preferably particles having substantially no angularity. The inorganic particles preferably have a shape of a sphere, an elliptical sphere, a rounded polyhedron, or a polyhedron with a circularity value close to 1.

From the standpoint of abrasion resistance, the inorganic particles has a new Mohs hardness of 10 or higher, preferably 12 or higher. The hardness of glass beads or silica having a new Mohs hardness of 7 is too low, and therefore, the use thereof as the inorganic particles cannot provide a coating film with excellent abrasion resistance. Examples of the inorganic particles having a new Mohs hardness of 10 or higher include particles of diamond, fluorinated diamond, boron carbide, silicon carbide, aluminum oxide (including ruby and sapphire), chrysoberyl, garnet, and fused zirconia.

The inorganic particles have an average particle size of preferably 5 to 40 µm, more preferably 10 µm or more. In the case of using the inorganic particles for forming a coating film with a thickness of 20 µm or less, the average particle size is more preferably 30 µm or less from the standpoint of surface smoothness.

The average particle size can be determined, for example, with a laser diffraction scattering particle size analyzer available from Nikkiso Co., Ltd.

The inorganic particles viewed from an arbitrary angle preferably have an average circularity of 0.90 or higher. The average circularity is more preferably 0.91 or higher, still more preferably 0.93 or higher, particularly preferably 0.95 or higher, and preferably 1.00 or lower.

The inorganic particles include a particle mixture having an average circularity of 0.90 or higher (or within the preferable neumerical range) obtained by uniformly mixing inorganic particles having a new Mohs hardness of 10 or higher and an average circularity of 0.90 or higher and particles having a new Mohs hardness of 10 or higher and an average circularity of less than 0.90.

The average circularity can be determined by an image processing program using a flow particle image analyzer.

From the standpoint of abrasion resistance, the inorganic particles are preferably at least one type selected from the group consisting of alumina particles and silicon carbide particles. The inorganic particles are preferably silicon carbide particles because the obtained coating film has still higher abrasion resistance.

The alumina may be either amorphous or crystalline, and may be, for example, a crystalline alumina such as γ-alumina having a γ phase as the principal crystal phase or α-alumina having an α phase as the principal crystal phase.

The alumina particles having a substantially spherical shape can be prepared by a known method such as spraying spheroidization.

The alumina particles can be also produced by the following methods.

To an aqueous solution in which a carboxylic acid compound is dispersed or dissolved are added an aqueous solution and an aqueous solution of a neutralizer at the same time, thereby forming particles of a hydroxide or hydrate of the metal, and the obtained particles are fired (see JP H05-139704 A, for example).

Aluminum alkoxide is brought into contact with water in the presence of an alcohol and a bipolar nonprotonic solvent to be hydrolized, without forming an emulsion, to prepare aluminum hydroxide, and the aluminum hydroxide is fired (see JP H08-198622 A, for example).

A flammable liquid containing an aluminum-containing compound is sprayed into droplets, and burned so that the aluminum-containing compound is converted to alumina and spheroidized (see JP H11-147711 A, for example).

Aluminum hydroxide with a dehydration temperature of 450° C. or higher and a purity of 99.9% by mass or higher is fired within a temperature range of 800° C. or higher and 1200° C. or lower in a chlorine atmosphere to give α-alumina particles (see JP 2001-302236 A, for example).

A small amount of an agent conventionally known as a mineralizer or a crystal growth accelerator for alumina, such as a halogen compound and a boron compound, is added to a pulverized product of fused alumina or sintered alumina and heating treatment is performed at a temperature of 1000° C. to 1550° C. (see JP-A H05-294613, for example).

Aluminum hydroxide powder or a slurry thereof is sprayed to a flame, and the obtained powder is collected at a high temperature of 500° C. or higher (see JP 2001-19425 A and JP 2001-226117 A, for example).

Powder of alumina or aluminum hydroxide is passed through a high-temperature region at 2000° C. or higher for a distance of 10 cm or longer to be formed into fused droplets, and the fused droplets are fallen to be cooled and solidified in a spherical shape by a free fall method (see JP 2005-179109 A, for example).

The silicon carbide particles having a substantially spherical shape can be prepared by a known method such as spraying spherocrystalization.

Alternatively, the silicon carbide particles can be prepared by a method including the step of preparing porous spherical particles by spray-drying a slurry of raw material silicon carbide that is an α-type crystal with an average particle size of 1 µm or less, and sintering the obtained porous spherical particles (see JP 2013-095637 A, for example).

In terms of abrasion resistance, the coating composition preferably contains the inorganic particles in an amount of 1 to 40% by mass relative to the amount of the fluororesin. The amount of the inorganic particles is more preferably 3% by mass or more and 30% by mass or less.

The coating composition contains the inorganic particles having a new Mohs hardness of 10 or higher and having a substantially spherical shape. The coating composition may further contain inorganic particles having a new Mohs hardness of lower than 10. Since the inorganic particles having a new Mohs hardness of lower than 10 do not affect the abrasion resistance, the shape thereof may be either substantially spherical or not spherical.

Examples of the inorganic particles having a new Mohs hardness of lower than 10 include colorants (e.g., glass, mica, carbon black, clay, talc, tourmaline, jade, germanium, barium sulfate, calcium carbonate, silica stone, topaz, beryl, quartz, titanium oxide, and iron oxide) and potassium titanate.

The coating composition may be either liquid or powder, and is preferably liquid. In the case where the coating composition is liquid, a flat and smooth coating fills can be obtained. Moreover, in the surface of the coating film, the inorganic particles are uniformly dispersed to exert the expected effect of abrasion resistance.

The coating composition may contain a liquid medium such as water and/or an organic liquid, and preferably contains water. In such a case, the coating composition may have a solid content concentration of 10 to 80% by mass. The "organic liquid" refers to an organic compound that is liquid at a normal temperature at around 20° C.

For formation of a further flat and smooth coating film, the coating composition also preferably contains a surfactant. The surfactant may be a conventionally known surfactant.

The coating composition can be prepared by a conventional mixing method such as a method of mixing the fluororesin, the inorganic particles, and the like using a mixer or a roll mill.

The coating composition may further contain any additive. The additive is not particularly limited, and examples thereof include leveling agents, solid lubricants, precipitation inhibitors, moisture absorbents, surface conditioners, thixotropic agents, viscosity modifiers, anti-gelling agents, ultraviolet absorbers, photostabilizers, plasticizers, anti-flooding agents, anti-skinning agents, scratch inhibitors, fungicides, antibiotics, antioxidants, antistatics, silane-coupling agents, colorants (e.g., carbon black, clay, talc, tourmaline, jade, germanium, extender pigments, silica stone, topaz, beryl, quartz, scaly pigments, glass, mica, titanium oxide, and iron oxide), film-forming agents (e.g., acrylic resins, urethane resins, polyethylene glycol, and polypropylene glycol), various reinforcing materials, various fillers, conductive fillers, and metal powders of gold, silver, copper, platinum, or stainless steel.

The coating composition is applied to a substrate to form a coating film. The coating film of the coating composition may be either a top-coat coating film or a primer coating film. Alternatively, the coating film may constitute an intermediate layer. The formed coating film is excellent in abrasion resistance. The present invention also encompasses a coating film prepared using the coating composition.

The coating composition may be applied to a substrate by any method. For the liquid coating composition, examples of the method include spray coating, roll coating, doctor blade coating, dip (immersion) coating, impregnation coating, spin-flow coating, and curtain-flow coating. Preferred is spray coating. For the powder coating composition, examples of the method include electrostatic coating, fluidized dip coating, and rotolining. Preferred is electrostatic coating.

After application of the coating composition, the coating film is fired. The firing is preferably performed after drying. The drying is preferably performed at a temperature of 80° C. to 200° C. for 5 to 30 minutes. The firing is preferably performed at a temperature of 300° C. to 400° C. for 10 to 90 minutes.

The present invention also encompasses a coating film containing the fluororesin and inorganic particles that have a new Mobs hardness of 10 or higher and has a substantially spherical shape. The coating film may be either a top-coat coating film or a primer coating film. Alternatively, the coating film may constitute an intermediate layer. The coating film of the present invention can be produced from the coating composition of the present invention.

In the coating film, the amount of the fluororesin is preferably 60 to 99% by mass relative to the total mass of the coating film. The amount of the fluororesin is more preferably 70% by mass or more and 97% by mass or less.

Examples of the fluororesin and the inorganic particles are the same as those exemplified as components of the coating composition of the present invention. The preferable amounts thereof are also the same as those of the coating composition of the present invention.

Specifically, the coating film preferably contains, as the fluororesin, the PTFE alone or a combination of the PTFE and a fluororesin other than the PTFE.

In the coating film, the amount of the PTFE is preferably 1% by mass or more, more preferably 20% by mass or more, still more preferably 40% by mass or more, particularly preferably 70% or more, relative to the total amount of the PTFE and the fluororesin other than the PTFE. The upper limit of the amount may be 100% by mass.

In the case where the coating film contains the PTFE and a fluororesin other than the PTFE, the mass ratio of the PTFE and the fluororesin other than the PTFE is preferably 1/99 to 99/1, more preferably 10/90 to 99/1, still more preferably 20/80 to 99/1. If the amount of the PTFE is too small, the abrasion resistance of the coating film may be insufficient.

In the coating film, the amount of the inorganic particles is preferably 1 to 40% by mass relative to the amount of the fluororesin. The amount of the inorganic particles is more preferably 3% by mass or more and 30% by mass or less.

The coating film preferably has a thickness of 1 to 100 µm. The thickness is more preferably 10 µm or more and 50 µm or less.

The coating film may contain those exemplified as optional components for the coating composition of the present invention, such as inorganic particles having a new Mohs hardness of less than 10, a heat-resistant resin, a surfactant, and additives.

Whether or not the inorganic particles contained in the coating film corresponds to the inorganic particles having a new Mohs hardness of or higher can be determined by heating the coating film to a temperature not lower than the temperature at which organic components such as the fluororesin are burned off and then specifying the material of inorganic residues resulting from the heating by a known analysis method such as scanning electron microscopy/energy dispersive X-ray spectroscopy (SEM-EDX), X-ray photoelectron spectroscopy (XPS), or time-of-flight secondary ion mass spectrometry (TOF-SIMS).

The average circularity of the inorganic particles having a new Mohs hardness of 10 or higher contained in the coating film can be determined by heating the coating film to a temperature not lower than the temperature at which organic components such as the fluororesin are burned off, subjecting the inorganic residues resulting from the heating to elemental mapping by SEM-EDX to specify a part corresponding to the particles having a new Mohs hardness of 10 or higher, and analyzing the particle in this image with an image analysis program such as Mac-View available from Mountech Co., Ltd.

The mass of the PTFE contained in the coating film, relative to the total mass of the PTFE and the fluororesin other than the PTFE can be calculated by a known method such as infrared spectroscopy or TG-DTA.

The amount of the inorganic particles having a new Mohs hardness of 10 or higher contained in the coating film, relative to the amount of the fluororesin, can be calculated by combining known techniques such as TG-DTA, elemental analysis, and elemental mapping.

The present invention also encompasses a laminate including the coating film.

Characters or drawings may be printed on the coating film. The printing method is not particularly limited, and examples thereof include pad printing. A printing ink used for the printing is not particularly limited, and examples thereof include a composition containing PES, a TFE homopolymer, and titanium oxide.

The laminate preferably further includes a substrate. The coating film may be either directly provided on the substrate or provided on the substrate via another layer. Moreover, still another layer may be provided on the coating film.

The laminate also preferably includes two or more layers of the coating films. Two or more layers of the coating films can contribute not only to further improvement of the abrasion resistance but also to, for example, improvement of the surface smoothness, design, and corrosion resistance.

The laminate also preferably includes another layer other than the substrate and the coating film. Examples of such a layer include a primer layer and an intermediate layer. These layers are commonly provided between the substrate and the coating film.

The laminate is more preferably: a laminate including a substrate and the coating film formed on the substrate; a laminate including a substrate, a primer layer formed on the substrate, and the coating film formed on the primer layer; or a laminate including a substrate, a primer layer formed on the substrate, an intermediate layer formed on the primer layer, and the coating film formed on the intermediate layer. Two or more intermediate layers may be provided.

The laminate may include a layer formed on the coating film for the purpose of achieving the effects of improving the surface smoothness, design, non-adhesiveness, and corrosion resistance. However, since the coating film has excellent abrasion resistance, no layer is preferably formed on the coating film. In other words, the coating film is preferably used as a top coat. The laminate preferably includes the coating film as a top coat.

The substrate may be formed of any material, and examples of the material include metals such as simple metals (e.g., iron, aluminum, stainless steel, and copper) and alloys thereof; and non-metallic inorganic materials such as enamel, glass, and ceramic. Examples of the alloys include stainless steel.

The substrate may be subjected to any surface treatment before the use, such as degreasing treatment or surface-roughening treatment, if necessary. The surface-roughening treatment may be performed by any method, and examples thereof include chemical etching with acid or alkali, anodizing (formation of anodic oxide coating), and sandblasting. In order to uniformly apply a primer composition for forming the primer layer without cissing, and to improve the adhesion between the substrate and the primer layer, the surface treatment may be appropriately chosen in accordance with the kinds of the substrate and the primer composition, and at is preferably sandblasting, for example.

The substrate may be subjected to a degreasing treatment in which the substrate is heated at 380° C. so that impurities such as oil are pyrolized and removed before the use. For better adhesion between the substrate and the coating film, an aluminum substrate which has been subjected to a surface-roughening treatment with an alumina abrasive after the surface treatment is preferably used.

The primer layer preferably contains a heat-resistant resin. Examples of the preferred heat-resistant resin are the same as those exemplified as the heat-resistant resin contained in the coating composition.

The amount of the heat-resistant resin is preferably 10 to 50% by mass of the primer layer, more preferably 15% by mass or more and 40% by mass or less, still more preferably 30% by mass or less.

The primer layer may or may not further contain a fluororesin. Examples of the fluororesin include PTFE, polychlorotrifluoroethylene (PCTFE), polyvinylidene fluoride (PVdF), polyvinyl fluoride (PVF), TFE/PAVE copolymers (PFA), TFE/HFP copolymers (FEP), TFE/CTFE copolymers, TFE/VdF copolymers, TFE/3FH copolymers, Et/TFE copolymers (ETFE), TFE/Pr copolymers, VdF/HFP copolymers, Et/CTFE copolymers (ECTFE), and Et/HFP copolymers. In particular, the primer layer preferably contains at least one selected from the group consisting of PTFE, PFA, and FEP.

The amount of the fluororesin is preferably 90 to 0% by mass of the primer layer, more preferably 85% by mass or less of the primer layer.

The primer layer may further contain inorganic particles. The inorganic particles are not particularly limited, and examples thereof include inorganic nitrides, carbides, borides, and oxides of zirconium, tantalum, titanium, tungsten, silicon, aluminum, or beryllium; and diamond, silicon carbide, and aluminum oxide. The inorganic particles may have a shape of, but not limited to, particles, flakes, or the like.

The primer layer may contain additives) in addition to the fluororesin, the heat-resistant resin, and the inorganic particles. Any additive may be contained, and examples thereof include those exemplified for the coating composition.

The primer layer has a thickness of preferably 1 to 40 µm, more preferably 5 to 35 µm. Too thin a primer layer may not be expected to show an anchor effect and may easily cause pinholes, so that the corrosion resistance of the laminate may be poor. Too thick a primer layer may easily suffer film defects such as cracks or scabs, so that the abrasion resistance, hardness, and corrosion resistance of the laminate may be poor. The upper limit of the thickness of the primer layer is still more preferably 30 µm, particularly preferably 25 µm.

The intermediate layer preferably contains a fluororesin. The preferable fluororesin is the same as that contained in the primer layer.

The amount of the fluororesin is preferably 60 to 100% by mass relative to the total mass of the intermediate layer. The amount of the fluororesin is more preferably 65 to 100% by mass, still more preferably 70 to 100% by mass. The use of the fluororesin within the above range can improve the adhesion between the intermediate layer and the coating film adjacent to the intermediate layer.

In the case where the intermediate layer is formed of the fluororesin and the heat-resistant resin, the intermediate layer has excellent adhesion to the primer layer because the heat-resistant resin in the intermediate layer has an affinity to the heat-resistant resin in the primer layer. The intermediate layer also has excellent adhesion to the coating film because the fluororesin in the intermediate layer has an affinity to the fluororesin in the coating film. As above, in the case where the intermediate layer is formed of the fluororesin and the heat-resistant resin, the intermediate layer has excellent adhesion to both the primer layer and the coating film.

The intermediate layer may further contain inorganic particles. The inorganic particles are preferably particles of at least one selected from the group consisting of inorganic nitrides, carbides, borides, and oxides of zirconium, tantalum, titanium, tungsten, silicon, aluminum, or beryllium; and diamond. In terms of easy availability and cost, preferred is silicon carbide or aluminum oxide. The inorganic particles may have a shape of, but not limited to, particles, flakes, or the like.

The amount of the inorganic particles is preferably 0.1 to 30% by mass, more preferably 1% by mass or more and 20% by mass or less of the intermediate layer.

The intermediate layer may contain additive(s) in addition to the fluororesin, the heat-resistant resin, and the inorganic particles. Any additive may be contained, and examples thereof include those exemplified for the coating composition.

The intermediate layer can be formed, for example, by applying a composition for an intermediate layer containing the fluororesin and the heat-resistant resin to a primer layer, and optionally drying and then firing the applied composition.

The intermediate layer has a thickness of preferably 5 to 30 µm, more preferably 10 to 25 µm.

The laminate can be suitably used for cooking utensils or industrial components for machineries or automobiles. The present invention also encompasses the cooing utensils. The cooking utensils and the industrial components for machineries or automobiles can maintain sufficient abrasion resistance even after use under a high temperature environment such as cooking with heat.

Examples of the cooking utensils include frying pans, pressure cookers, pots, electric skillets, rice cookers, ovens, electric griddles, bread baking pans, knives, gas cooktops, bread makers, inner surfaces of microwave ovens, hot water dispensers, electric kettles, Taiyaki (Japanese fish-shaped cake) makers, waffle makers, and hot sandwich makers. Examples of the industrial components for machineries or automobiles include engine pistons, stabilizers, reed valve sheets, wires, and bearings for automobiles.

EXAMPLES

The present invention is specifically described in the following with reference to, but not limited to, examples.

The numerical values in the examples were determined by the following methods.

Measurement of Average Circularity

The value measured with FPIA-2100 available from Sysmex Corporation was taken as the average circularity.

The numerical value data provided by the raw material maker measured for about 10,000 particles (effectively analyzed particles) in a test sample prepared by mixing 1.5 g of the particles with 30 ml of an appropriate solvent such as sodium hexametaphosphate, with a flow particle image analyzer FPIA-2100 available from Sysmex Corporation based on the formula:

$$\text{Circularity} = (4\pi S)^{1/2}/L,$$

where $\pi$ represents the circular constant, S represents the area of the projected figure, and L represents the circumference of the projected figure was used as the average circularity of the particles. The average circularity was also obtained by analyzing arbitrarily selected 50 particles in an electron microscopic image (100×) of the particles using an image analysis program Mac-View available from Mountech Co., Ltd. based on the formula:

$$\text{Circularity} = (4\pi S)^{1/2}/L,$$

where $\pi$ represents the circular constant, S represents the area of the projected figure, and L represents the circumference of the projected figure. The obtained average circularity was almost the same as that obtained using FPIA-2100.

Measurement of Film Thickness

In the application of the compositions to form a laminate of coating films described later, the respective compositions were simultaneously applied to a dummy aluminum plate (A-1050P). The thicknesses of the respective coating films formed on the dummy aluminum plate were measured with an eddy-current film thickness meter available from Sanko Electronic Laboratory Co., Ltd., and treated as the thicknesses of the respective layers.

Abrasion Resistance

A pad for industrial use (trade name: Scotch-Brite 7447C) available from 3M Company was cut into a size of 3 cm square, and a 2 cc portion of a 5% neutral detergent was dropped thereon. The obtained pad was reciprocated on the film at a load of 4.5 kg, and the abrasion resistance was evaluated by the number of reciprocating motions until the substrate was exposed.

Preparation of Top-Coat Coating Composition

To an aqueous coating composition containing a fluororesin as a main component was added a predetermined amount of inorganic particles, and stirred and mixed to prepare a top-coat coating composition.

Examples 1 to 3 and 6 to 24, Comparative Examples 1 to 4

The following components were mixed and then blended with a predetermined amount of predetermined inorganic particles as specified in Table 1. The mixture was stirred to prepare a top-coat coating composition.
Tetrafluoroethylene polymer aqueous dispersion (solid content of 62%): 66.7 parts
  Film forming agent: 12.4 parts
  Carbon black millbase (solid content of 20%): 0.5 parts
  Pearl luster pigment: 0.8 parts
  Surfactant: 5.6 parts
  Water: 14.0 parts
In Examples 16 and 17 and Comparative Example 4, "substantially spherical" silicon carbide (average particle size: 17 μm, average circularity: 0.97) described later and "non-spherical" silicon carbide (average particle size: μm, average circularity: 0.86) were uniformly mixed at a ratio of 83:17, 50:50, and 10:90, respectively, and used Each mixture had an average circularity as shown in Table 1.

Example 4

The following components were mixed and then blended with a predetermined amount of predetermined inorganic particles as specified in Table 1. The mixture was stirred to prepare a top-coat coating composition.
Tetrafluoroethylene polymer aqueous dispersion (solid content of 62%): 33.3 parts
Tetrafluoroethylene/perfluoro(alkyl vinyl ether) copolymer aqueous dispersion (solid content of 62%): 33.4 parts
  Film forming agent: 12.4 parts
  Carbon black millbase (solid content of 20%): 0.5 parts
  Pearl luster pigment: 0.8 parts
  Surfactant: 5.6 parts
  Water: 14.0 parts

Example 5

The following components were mixed and then blended with a predetermined amount of predetermined inorganic particles as specified in Table 1. The mixture was stirred to prepare a top-coat coating composition.
Tetrafluoroethylene/perfluoro(alkyl vinyl ether) copolymer aqueous dispersion (solid content of 62%): 66.7 parts
  Film forming agent: 12.4 parts
  Carbon black millbase (solid content of 20%): 0.5 parts
  Pearl luster pigment: 0.8 parts
  Surfactant: 5.6 parts
  Water: 14.0 parts

Example 25

The following components were mixed and then blended with a predetermined amount of predetermined inorganic particles as specified in Table 1. The mixture was stirred to prepare a top-coat coating composition.
Tetrafluoroethylene polymer aqueous dispersion (solid content of 62%): 13.3 parts
Tetrafluoroethylene/perfluoro(alkyl vinyl ether) copolymer aqueous dispersion (solid content of 62%): 53.4 parts
  Film forming agent: 12.4 parts
  Carbon black millbase (solid content of 20%): 0.5 parts
  Pearl luster pigment: 0.8 parts
  Surfactant: 5.6 parts
  Water: 14.0 parts
Coating compositions a to e shown in Table 1 had the following compositions.

Coating Composition a

Tetrafluoroethylene polymer aqueous dispersion (solid content of 62%): 65.6 parts
Film forming agent: 12.2 parts, Carbon black millbase (solid content of 20%): 0.5 parts
Pearl luster pigment: 0.8 parts
Silicon carbide (average particle size of 17 µm, average circularity of 0.97): 1.8 parts
Surfactant: 5.5 parts
Water: 13.6 parts

Coating Composition b

Tetrafluoroethylene polymer aqueous dispersion (solid content of 62%): 66.7 parts
Film forming agent: 12.4 parts
Carbon black millbase (solid content of 20%): 0.5 parts
Pearl luster pigment: 0.8 parts
Surfactant: 5.6 parts
Water: 14.0 parts

Coating Composition c

Tetrafluoroethylene polymer aqueous dispersion (solid content of 62%): 32.0 parts
Carbon black millbase (solid content of 25%): 8.4 parts
PES aqueous dispersion. (solid content of 20%): 24.3 parts
Silicon carbide (average particle size of 17 µm, average circularity of 0.97): 1.8 parts
Surfactant: 2.0 parts
Thickener: 14.2 parts
Water: 17.3 parts

Coating Composition d

Tetrafluoroethylene polymer aqueous dispersion (solid content of 62%): 32.4 parts
Carbon black millbase (solid content of 25%): 8.6 parts
PES aqueous dispersion (solid content of 20%): 24.8 parts
Surfactant: 2.0 parts
Thickener: 14.4 parts
Water: 17.8 parts

Coating Composition e

Carbon black millbase (solid content of 20%): 1.4 parts
PES aqueous dispersion (solid content of 20%): 50.3 parts
Thickener: 10.7 parts
Silicon carbide (average particle size of 12 µm, average circularity of 0.86): 18.7 parts
Surfactant: 3.0 parts
Water: 15.9 parts

Examples 1 to 5, 8 to 17, and 25, Comparative Examples 1 to 4

Preparation of Test Plate

A surface of an aluminum plate (A-10502) was degreased with acetone, and then roughened by sand-blasting so as to have a surface roughness Ra of 2.0 to 3.0 µm determined in conformity with JIS B0601-2001. Costs on the surface were removed by air blowing. The coating composition shown in Table 1, as a primer, was spray-applied using a gravity-feed spray gun at a spraying pressure of 0.2 MPa so as to have a dry thickness of 10 to 15 µm. The resulting coating film on the aluminum plate was dried at 80° C. to 100° C. for 15 minutes, and then cooled down to room temperature. To the obtained primer coating film was spray-applied the top-coat coating composition shown in Table 1 to have a thickness after firing as specified in Table 1. The resulting coated plate was dried at 80° C. to 100° C. for 15 minutes and then fired at 380° C. for 20 minutes to prepare a test coated plate. The obtained test coated plate was a laminate in which the primer layer and a top coat shown in Table 1 were formed on an aluminum plate.

Examples 6, 7, 18, and 19

Preparation of Test Plate

A surface of an aluminum plate (A-1050P) was degreased with acetone, and then roughened by sand-blasting so as to have a surface roughness Ra of 2.0 to 3.0 µm determined in conformity with JIS B0601-2001. Dusts on the surface were removed by air blowing. The coating composition shown in Table 1, as a primer, was spray-applied using a gravity-feed spray gun at a spraying pressure of 0.2 MPa so as to nave a dry thickness of 10 to 15 µm. The resulting coating film on the aluminum plate was dried at 80° C. to 100° C. for 15 minutes, and then cooled down to room temperature. Next, the coating composition shown in Table 1 as the coating composition for an intermediate layer 1 was applied to a dry thickness of 10 to 20 µm. The resulting coating film on the aluminum plate was dried at 80° C. to 100° C. for 15 minutes, and then cooled down to room temperature. To the obtained coating film was spray-applied the top-coat coating composition shown in Table 1 to have a thickness after firing as specified in Table 1.

The resulting coated plate was dried at 80° C. to 100° C. for 15 minutes and then fired at 380° C. for 20 minutes to prepare a test coated plate. The obtained test coated plate was a laminate in which the primer layer, the intermediate layer 1, and a top coat shown in Table 1 were formed on the aluminum plate.

Examples 20 to 24

A surface of an aluminum plate (A-10502) was degreased with acetone, and then roughened by sand-blasting so as to have a surface roughness Ra of 2.0 to 3.0 µm determined in conformity with JIS B0601-2001. Dusts on the surface were removed by air blowing. The coating composition shown in Table 1, as a primer, was spray-applied using a gravity-feed spray gun at a spraying pressure of 0.2 MPa so as to have a dry thickness of 10 to 15 µm. The resulting coating film on the aluminum plate was dried at 80° C. to 100° C. for 15 minutes, and then cooled down to room temperature. Next, the coating composition shown in Table 1 as the coating composition for an intermediate layer 2 was applied to a dry thickness of 10 to 20 µm. The resulting coating film on the aluminum plate was dried at 80° C. to 100° C. for 15 minutes, and then cooled down to room temperature.

Next, the coating composition shown in Table 1 as the coating composition for an intermediate layer 1 was applied to a dry thickness of 10 to 20 μm. The resulting coating film on the aluminum plate was dried at 80° C. to 100° C. for 15 minutes, and then cooled down to room temperature. To the obtained coating film was spray-applied the top-coat coating composition shown in Table 1 to have a thickness after firing as specified in Table 1. The resulting coated plate was dried at 80° C. to 100° C. for 15 minutes and then fired at 380° C. for 20 minutes to prepare a test coated plate. The obtained test coated plate was a laminate in which the primer layer, intermediate layer 2, intermediate layer 1, and a top coat shown in Table 1 were formed on the aluminum plate. Table 1 shows the results of the abrasion resistance test.

The inorganic particles used were commercially available particles of alumina, silicon carbide, or glass beads. Inorganic particles prepared by pulverization to be used as an abrasive were used as "non-spherical inorganic particles", and inorganic particles treated by a known spraying spheroidization or the like were used as "substantially spherical inorganic particles". Table 1 shows the average particle size and average circularity of the particles.

It should be noted that alumina has a new Mohs hardness of 12, silicon carbide has a new Mohs hardness of 14, and glass beads have a new Mohs hardness of 7. Moreover, it is known that a pearl luster pigment in the coating composition has a new Mobs hardness corresponding to 3 and carbon black has a new Mobs hardness of 1 to 3.

Example 1 in which spherical alumina particles were used achieved markedly higher abrasion resistance than Comparative Example 1 in which non-spherical alumina was used in the same amount.

Example 2 in which spherical particles of silicon carbide that has a still higher hardness than alumina achieved excellently high abrasion resistance which was much higher than that achieved in Comparative Example 2 in which non-spherical silicon carbide was used in the same amount. Comparative Example 3 in which spherical glass beads in the same amount were used failed to achieve sufficient abrasion resistance.

Example 3 in which a larger amount of spherical silicon carbide was used achieved still higher abrasion resistance.

in Example 4, the fluororesin used was a mixture of equal parts of PTFE and PFA. In Example 5, the fluororesin used was PFA alone. In comparison of these examples with Example 2 in which the fluororesin used was PTFE alone, Example 2 achieved the highest abrasion resistance.

In Example 6, the same top-coat coating composition as that used in Example 2, the coating composition d for the intermediate layer 1, and the coating composition e as a primer were applied to form triple coating, resulting in still higher abrasion resistance.

In Example 7, the same top-coat coating composition as that used in Example 3, the coating composition d for the intermediate layer 1, and the coating composition e as a primer were applied to form triple coating, resulting in extremely high abrasion resistance.

In Example 8, though the amount of spherical silicon carbide was reduced to half of that in Example 2, the abrasion resistance was sufficiently high in comparison with that in Comparative Example 2.

In Example 9, the amount of spherical silicon carbide was further increased compared to that in Example 3 to improve the abrasion resistance. However, the degree of the improvement was small.

In Example 10, the top-coat coating composition was applied to a smaller thickness than that in Example 2, resulting in still sufficiently high abrasion resistance.

In Example 11, the thickness of the top-coat coating composition was increased, resulting in a remarkable improvement of the abrasion resistance.

In Examples 12 to 14, the abrasion resistance was better as the spherical silicon carbide had a larger average particle size. Example 15 in which spherical silicon carbide having a large average particle size were used and the coating film formed was thick achieved still higher abrasion resistance.

In Examples 16 and 17 and Comparative Example 4, spherical silicon carbide (average particle size: 17 μm, average circularity: 0.97) and non-spherical silicon carbide (average particle size: 17 μm, average circularity: 0.86) were uniformly mixed at a ratio of 83:17, 50:50, and 10:90, respectively, and used. The average circularity after the mixing and the abrasion resistance of the coating film were as shown in Table 1.

In Examples 18 and 19, the top-coat coating composition was prepared in the same manner as in Example 2, except that no binder resin was used. The resulting composition was used for an intermediate layer, and triple coating was formed. In each example, high abrasion resistance was achieved.

In Examples 20 to 24, various configurations of coating films were employed and quadruple coating was formed, resulting in extremely high abrasion resistance in each example.

Example 25 in which a mixture of PTFE and PFA at a mass ratio of 20:80 was used as a fluororesin achieved higher abrasion resistance than Example 5.

The coating film of Example 2 was cut into a size of 3 cm square and heated to 600° C. or higher at which the fluororesin is burned off. By elemental mapping of the residues using SEM-EDX, a part corresponding to the silicon carbide was specified. The average circularity of arbitrarily selected 50 silicon carbide particles in the image was measured using an image analysis program Mac-View available from Mountech Co., Ltd. based on the formula:

$$\text{Circularity} = (4\pi S)^{1/2}/L,$$

where $\pi$ represents the circular constant, S represents the area of the projected figure, and L represents the circumference of the projected figure. The obtained value was 0.98 which was almost the same as that measured before application of the coating composition.

Moreover, the values of the average circularity of the silicon carbide in the residues of the coating films of Examples 16 and 17 and Comparative Example 2 were determined in the same manner as in the case of the coating film of Example 2, and were 0.93, 0.92, and 0.88, respectively, which were almost the same as those measured before application of the coating composition.

TABLE 1

| | | Top coat | | | | | |
|---|---|---|---|---|---|---|---|
| | | Top-coat coating composition | | | | | |
| | | | Inorganic particles | | | | |
| | Fluororesin | Material | New Mohs hardness | Average particle size (μm) | Average circularity | Amount relative to fluororesin (wt %) | Amount relative to fluororesin (vol %) | Thickness (μm) |
| Example 1 | PTFE | Alumina | 12 | 17 | 0.98 | 4 | 2 | 20 |
| Example 2 | PTFE | Silicon carbide | 14 | 17 | 0.97 | 4 | 3 | 20 |
| Example 3 | PTFE | Silicon carbide | 14 | 17 | 0.97 | 10 | 7 | 20 |
| Example 4 | PTFE/PFA = 50/50 | Silicon carbide | 14 | 17 | 0.97 | 4 | 3 | 20 |
| Example 5 | PFA | Silicon carbide | 14 | 17 | 0.97 | 4 | 3 | 20 |
| Example 6 | PTFE | Silicon carbide | 14 | 17 | 0.97 | 4 | 3 | 20 |
| Example 7 | PTFE | Silicon carbide | 14 | 17 | 0.97 | 10 | 7 | 20 |
| Example 8 | PTFE | Silicon carbide | 14 | 17 | 0.97 | 2 | 1 | 20 |
| Example 9 | PTFE | Silicon carbide | 14 | 17 | 0.97 | 20 | 13 | 20 |
| Example 10 | PTFE | Silicon carbide | 14 | 17 | 0.97 | 4 | 3 | 15 |
| Example 11 | PTFE | Silicon carbide | 14 | 17 | 0.97 | 4 | 3 | 30 |
| Example 12 | PTFE | Silicon carbide | 14 | 19 | 0.98 | 4 | 3 | 20 |
| Example 13 | PTFE | Silicon carbide | 14 | 26 | 0.97 | 4 | 3 | 20 |
| Example 14 | PTFE | Silicon carbide | 14 | 34 | 0.96 | 4 | 3 | 20 |
| Example 15 | PTFE | Silicon carbide | 11 | 34 | 0.96 | 4 | 3 | 30 |
| Example 16 | PTFE | Silicon carbide | 14 | 17 | 0.94 | 4 | 3 | 20 |
| Example 17 | PTFE | Silicon carbide | 14 | 17 | 0.92 | 4 | 3 | 20 |
| Example 18 | PTFE | Silicon carbide | 14 | 17 | 0.97 | 4 | 3 | 20 |
| Example 19 | PTFE | Silicon carbide | 14 | 17 | 0.97 | 4 | 3 | 20 |
| Example 20 | PTFE | Silicon carbide | 14 | 17 | 0.97 | 4 | 3 | 20 |
| Example 21 | PTFE | Silicon carbide | 14 | 17 | 0.97 | 4 | 3 | 20 |
| Example 22 | PTFE | Silicon carbide | 14 | 17 | 0.97 | 4 | 3 | 20 |
| Example 23 | PTFE | Silicon carbide | 14 | 17 | 0.97 | 4 | 3 | 20 |
| Example 24 | PTFE | Silicon carbide | 14 | 17 | 0.97 | 4 | 3 | 20 |
| Example 25 | PTFE/PFA = 20/80 | Silicon carbide | 14 | 17 | 0.97 | 4 | 3 | 20 |
| Comparative Example 1 | PTFE | Alumina | 12 | 17 | 0.86 | 4 | 2 | 20 |
| Comparative Example 2 | PTFE | Silicon carbide | 14 | 21 | 0.87 | 4 | 3 | 20 |
| Comparative Example 3 | PTFE | Glass | 7 | 15 | 0.98 | 4 | 4 | 20 |
| Comparative Example 4 | PTFE | Silicon carbide | 14 | 17 | 0.88 | 4 | 3 | 20 |

| | Intermediate layer 1 | | Intermediate layer 2 | | Primer layer | | Abrasion resistance (times) |
|---|---|---|---|---|---|---|---|
| | Coating composition | Thickness (μm) | Coating composition | Thickness (μm) | Coating composition | Thickness (μm) | |
| Example 1 | — | — | — | — | d | 10 | 2000 |
| Example 2 | — | — | — | — | d | 10 | 20500 |
| Example 3 | — | — | — | — | d | 10 | 47000 |
| Example 4 | — | — | — | — | d | 10 | 8000 |
| Example 5 | — | — | — | — | d | 10 | 4500 |
| Example 6 | d | 15 | — | — | e | 10 | 22500 |
| Example 7 | d | 15 | — | — | e | 10 | 53000 |
| Example 8 | — | — | — | — | d | 10 | 11000 |
| Example 9 | — | — | — | — | d | 10 | 48000 |
| Example 10 | — | — | — | — | d | 10 | 10000 |
| Example 11 | — | — | — | — | d | 10 | 32000 |
| Example 12 | — | — | — | — | d | 10 | 21000 |
| Example 13 | — | — | — | — | d | 10 | 38000 |
| Example 14 | — | — | — | — | d | 10 | 40000 |
| Example 15 | — | — | — | — | d | 10 | 50000 |
| Example 16 | — | — | — | — | d | 10 | 18000 |
| Example 17 | — | — | — | — | d | 10 | 8000 |
| Example 18 | a | 15 | — | — | d | 10 | 53500 |
| Example 19 | b | 15 | — | — | d | 10 | 22500 |
| Example 20 | a | 15 | d | 15 | e | 10 | 55000 |
| Example 21 | b | 15 | d | 15 | e | 10 | 24500 |
| Example 22 | d | 15 | d | 15 | e | 10 | 25000 |
| Example 23 | b | 15 | c | 15 | d | 10 | 28000 |

TABLE 1-continued

| | | | | | | | |
|---|---|---|---|---|---|---|---|
| Example 24 | a | 15 | c | 15 | e | 10 | 72500 |
| Example 25 | — | — | — | — | d | 10 | 6500 |
| Comparative Example 1 | — | — | — | — | d | 10 | 500 |
| Comparative Example 2 | — | — | — | — | d | 10 | 2000 |
| Comparative Example 3 | — | — | — | — | d | 10 | <100 |
| Comparative Example 4 | — | — | — | — | d | 10 | 3000 |

The invention claimed is:

1. A laminate comprising:
a primer layer; and
a top coat produced from a coating composition, the coating composition comprising a fluororesin; and inorganic particles,
the inorganic particles having a new Mohs hardness of 10 or higher, and having an average particle size of 17 to 34 μm,
wherein the inorganic particles are silicon carbide particles,
wherein the amount of the inorganic particles is 2 to 20% by mass relative to the amount of the fluororesin,
wherein the inorganic particles viewed from an arbitrary angle have an average circularity of 0.92 to 0.98, and
wherein the fluororesin contained includes polytetrafluoroethylene alone.

2. The laminate according to claim 1, further comprising:
a substrate.

3. The laminate according to claim 1, which is a cooking utensil.

4. The laminate according to claim 1, wherein the inorganic particles viewed from an arbitrary angle have an average circularity of 0.95 to 0.98.

* * * * *